United States Patent
Kendall et al.

(10) Patent No.: US 7,286,570 B2
(45) Date of Patent: Oct. 23, 2007

(54) HIGH SPEED SEQUENCED MULTI-CHANNEL BUS

(75) Inventors: Chad Kendall, Vancouver (CA); Joey Chow, Nepean (CA); Robert J. Nesbitt, Vancouver (CA)

(73) Assignee: Alcatel-Lucent Canada Inc, Ottawa, Ontario (CA)

( * ) Notice: Subject to any disclaimer, the term of this patent is extended or adjusted under 35 U.S.C. 154(b) by 1036 days.

(21) Appl. No.: 09/988,940

(22) Filed: Nov. 21, 2001

(65) Prior Publication Data

US 2003/0103509 A1   Jun. 5, 2003

(51) Int. Cl.
  *H04J 3/04* (2006.01)
(52) U.S. Cl. .................. 370/535; 370/536; 370/543; 375/260
(58) Field of Classification Search .............. None
  See application file for complete search history.

(56) References Cited

U.S. PATENT DOCUMENTS

| | | | | |
|---|---|---|---|---|
| 5,065,396 | A | * | 11/1991 | Castellano et al. ......... 370/536 |
| 6,002,670 | A | * | 12/1999 | Rahman et al. ............. 370/238 |
| 6,205,142 | B1 | * | 3/2001 | Vallee ........................ 370/394 |
| 6,647,019 | B1 | * | 11/2003 | McKeown et al. ......... 370/422 |
| 6,775,305 | B1 | * | 8/2004 | Delvaux ...................... 370/535 |
| 6,788,686 | B1 | * | 9/2004 | Khotimsky et al. ......... 370/394 |
| 6,990,097 | B2 | * | 1/2006 | Norman et al. ............. 370/386 |
| 2003/0016697 | A1 | * | 1/2003 | Jordan ........................ 370/466 |

FOREIGN PATENT DOCUMENTS

| | | |
|---|---|---|
| EP | 1 024 632 A2 | 8/2000 |
| WO | WO96/17489 A1 | 6/1996 |
| WO | WO 01/20947 A1 | 3/2001 |

* cited by examiner

*Primary Examiner*—Huy D. Vu
*Assistant Examiner*—Toan Nguyen
(74) *Attorney, Agent, or Firm*—Oyen Wiggs Green & Mutala LLP (57) ABSTRACT

Apparatus for transmitting a data stream between cards connected by a midplane breaks the data stream into a plurality of channels. The apparatus comprises a serializer for each channel. Serialized data is transmitted across the midplane to a deserializer at the destination. Sequential cells are sent in different channels. Cell ordering is preserved by staggering the start of cell transmission in the channels. The invention permits data to be transmitted across a mid plane using a reduced number of data lines. The data stream on each card may be carried in a wide bus at a relatively low clock rate. Apparatus according to the invention may be used to transmit an OC-192 data stream across a pin-limited interface.

14 Claims, 5 Drawing Sheets

HIGH SPEED SEQUENCED MULTI-CHANNEL BUS

TECHNICAL FIELD

This invention relates to telecommunication devices. In particular, the invention relates to methods and apparatus for transporting packets at high speed over a pin-limited interface while maintaining packet integrity and sequencing. The invention has application in devices such as switches and routers.

BACKGROUND

A general problem in the telecommunications field is to convey data packets between different devices or parts of a device in an efficient manner. Data switches are an example of a type of device in which this problem can occur. Switches are used to selectively route data signals to their destinations.

A typical switch comprises a number of line cards which each provide an interface to one or more data lines. The data lines typically comprise optical fibers. When a packet is received at a line card, the packet is sent to a fabric interface card that interfaces to a switch fabric. The switch fabric determines an output data line on which the packet should be sent to reach its destination. This determination may be made, for example, on the basis of information in the packet's header. The switch fabric then routes the packet, by way of a fabric interface card, to the line card which is connected to the output data line. An example of a switch which has this general architecture is the ALCATEL™ model 7670 switch.

Communication between the line cards and fabric interface cards is generally provided over a midplane. The midplane is typically limited in terms of the number of signal paths that it can maintain between different cards. Consequently, the midplane can present a bottleneck which interferes with reaching the goal of higher throughput. There is continual pressure to increase the rate at which packets can be handled. Currently it is desired to support the OC-192 standard which operates at 10 Gbps data rates.

Various protocols exist which could be used to provide high speed data communications over a midplane. None of these currently available protocols are ideal. Available protocols include POS-PHY4 (Packet over SONET—Physical Layer 4) and FlexBus4™. A problem with POS-PHY4 is that it is difficult to implement in a cost-effective manner using ASICs (application specific integrated circuits) and FPGAs (field programmable gate arrays). FlexBus4 requires an interface which has an undesirably high pin-count. This increases the cost of providing switch hardware which uses the FlexBus4 protocol to carry data.

Lower-rate interfaces such as Utopia3 (universal test and operations physical interface for ATM) exist. Utopia3 provides a 32 bit bus operating at up to 100 MHz for data rates up to 3.2 Gbs. However, it has so far not been considered to be practical to provide increased bandwidth by using several such interfaces simultaneously because cells can get out of sequence.

There remains a need for cost-effective methods for transmitting data at high speed between devices over a pin-limited interface. There is currently a particular need for such methods capable of handling OC-192 data rates, which require an aggregate bandwidth of at least 12.8 Gps. In the future it will be desirable to accommodate higher data rates.

SUMMARY OF THE INVENTION

This invention provides methods and apparatus for conveying data between points which are connected by an interface, particularly an interface which provides a limited number of signal conductors.

One aspect of the invention provides data transmission apparatus. The apparatus comprises a first transmit interface for transmitting a data stream comprising a sequence of fixed-size cells to a receiver. The first transmit interface comprises a first demultiplexer connected to receive the data stream and to split the data stream by delivering the cells in rotation into a plurality of N transmit channels so that each transmit channel carries every $N^{th}$ cell; for each channel a data transmitting device connected to receive the cells of the transmit channel and to output the cells on one or more data connections to a receiver; and, a first transmit control circuit connected to the data transmitting devices, the transmit control circuit configured to cause the transmitting devices to output the cells in sequence with the commencement of transmission of cells on sequential transmit channels staggered in time relative to one another by a time difference ΔT. The transmitting devices may each comprise a serializer device and the data connections may comprise serial data connections.

Another aspect of the invention provides data transmission apparatus comprising: means for carrying a data stream comprising a sequence of cells in an order; demultiplexing means for assigning each of the cells of the data stream to one of a plurality of channels; transmitting means for transmitting the cells in each channel to a receiver; and, control means for commencing the transmission of individual cells to the receiver, in the order, at times staggered relative to one another by a time difference ΔT. The transmitting means may comprise means for serially transmitting the cells in each channel to a receiver. The apparatus may comprise means for receiving a plurality of cells transmitted serially in a plurality of channels by another data transmitting device and means for determining an order of arrival of the plurality of cells.

Another aspect of the invention provides a telecommunications switch comprising a plurality of line cards, a switching fabric, a plurality of fabric interface cards connected to the switching fabric and a midplane providing a plurality of data lines connecting the line cards and the fabric interface cards. The switch comprises at least one bidirectional interface connecting one of the line cards and one of the fabric interface cards. The bidirectional interface carryies a first sequence of data cells in a data stream received at the line card in a first direction from the line card to the corresponding fabric interface card and a second sequence of data cells in a second direction from the fabric interface card to the line card. The bidirectional interface comprises: a first demultiplexer connected to receive the first data stream and to split the first data stream into a plurality of N first direction channels so that each first direction channel carries every $N^{th}$ cell; for each first direction channel, a serializer device connected to receive the cells of the first direction channel and to output the cells as serial data on one or more serial data connections extending through the midplane to the fabric interface card; a first transmit control circuit connected to the serializer devices, the transmit control circuit configured to cause the serializer devices to output the cells in sequence order with the commencement of transmission of cells on different first direction channels staggered in time relative to one another by a time difference ΔT; a plurality of deserializer devices at the fabric interface card, the deserializer devices connected to receive and deserialize the serial data on the serial data connections; a first direction receive control circuit connected to detect an order of arrival of cells on the serial data connections and to place the cells into a received data stream in the order of arrival; a second demultiplexer at the fabric interface card and connected to receive the second data stream and to split the second data stream into a plurality of N second direction channels so that each second direction channel carries every Nth cell; for each second direction channel a serializer device connected to receive the cells of the second direction channel and to output the cells as serial data on one or more serial data connections extending through the midplane to the line card; a second transmit control circuit connected to the serializer devices, the transmit control circuit configured to cause the serializer devices to output the cells in sequence order with the commencement of transmission of cells on different second direction channels staggered in time relative to one another by a time difference $\Delta T$; a plurality of second deserializer devices at the line card, the deserializer devices connected to receive and deserialize the serial data on the serial data connections; and, a second direction receive control circuit connected to detect an order of arrival of cells on the serial data connections and to place the cells into a received data stream in the order of arrival.

The invention also provides a method for transmitting a data stream comprising a sequence of fixed-size cells to a receiver. The method comprises: assigning consecutive cells of the data stream into different ones of a plurality of channels; and, simultaneously transmitting to the receiver data on each of the channels while staggering transmission of consecutive ones of the cells in time relative to one another by a time difference $\Delta T$. The method may comprise serializing the data of each channel before transmitting the data of the channel.

Still another aspect of the invention provides a method for transmitting a sequence of cells, in order, from a transmitting device to a receiving device. The method comprises: assigning each of the cells to one of a plurality of channels in rotation, each of the channels having a recurring cell transmit time, the cell transmit times for successive channels staggered relative to one another by amounts exceeding any inter-channel differences in skew and latency; in each channel, transmitting the cells in sequence to the receiving device over one or more serial data connections and commencing transmission of each cell only at the cell transmit time for that channel. The method may comprise receiving and deserializing the transmitted cells at a receiving device, and detecting an order of arrival of the cells at the receiving device.

Further features and advantages of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention, However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
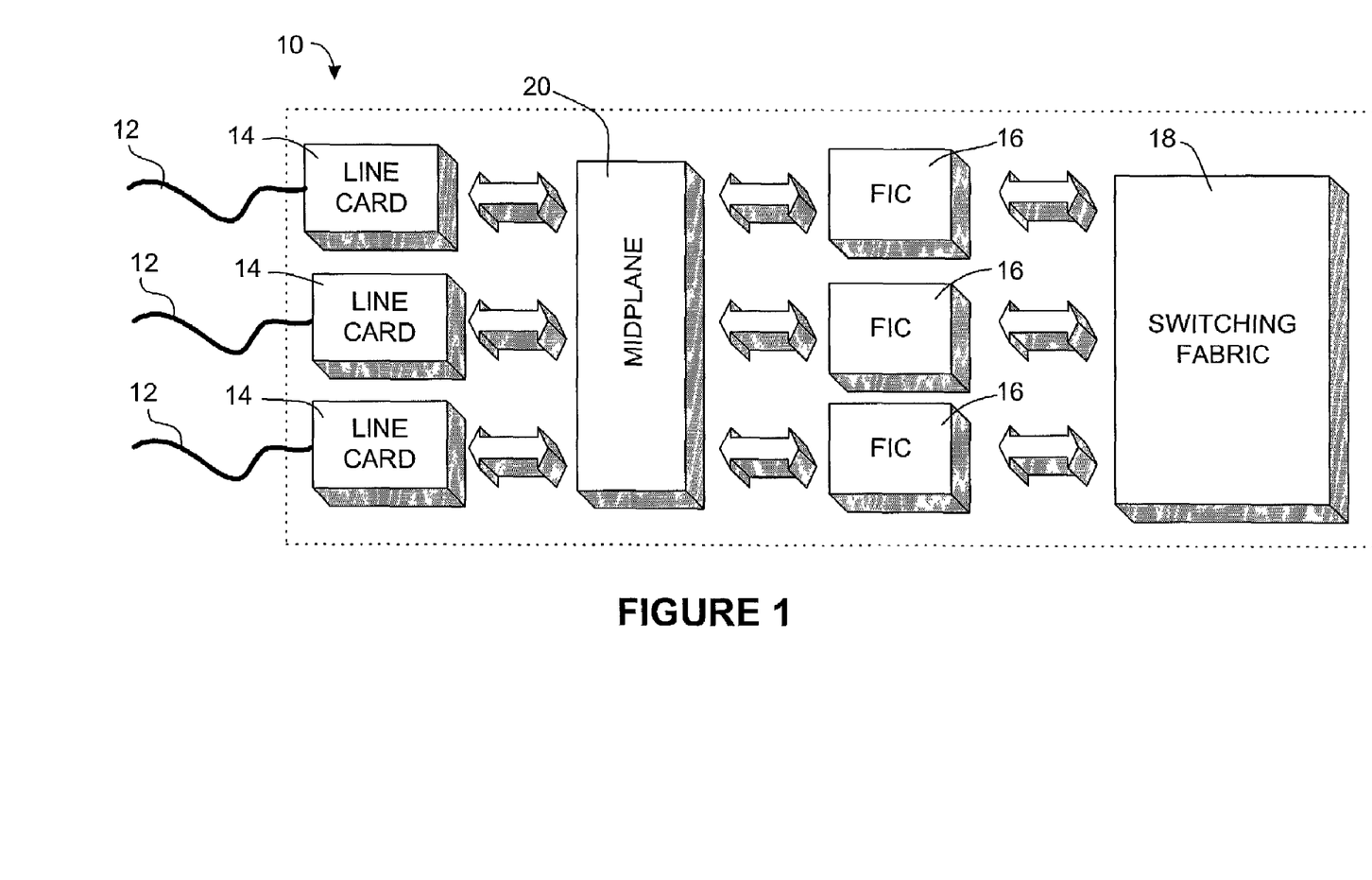
FIG. 1 is a block diagram of major components of a switch in which data is carried across a midplane according to the invention.

FIG. 1 shows a switch 10 which is used to illustrate this invention. The invention is not limited to use in switches but has application to other devices in which data packets must be carried between parts of a device, or between different devices. Switch 10 is connected to a number of optical fibers 12 each carrying an OC-192 data stream at 12.8 Gb/s. The invention is not limited to OC-192 data.

Switch 10 comprises a number of line cards 14 each associated with at least one optical fiber input 12. Switch 10 also comprises a number of switch fabric interface cards (FICs) 16 and a switching fabric 18. A midplane 20 permits data to be communicated back and forth between line cards 14 and FICs 16. Each FIC provides an interface to switching fabric 18.

Figure 2:
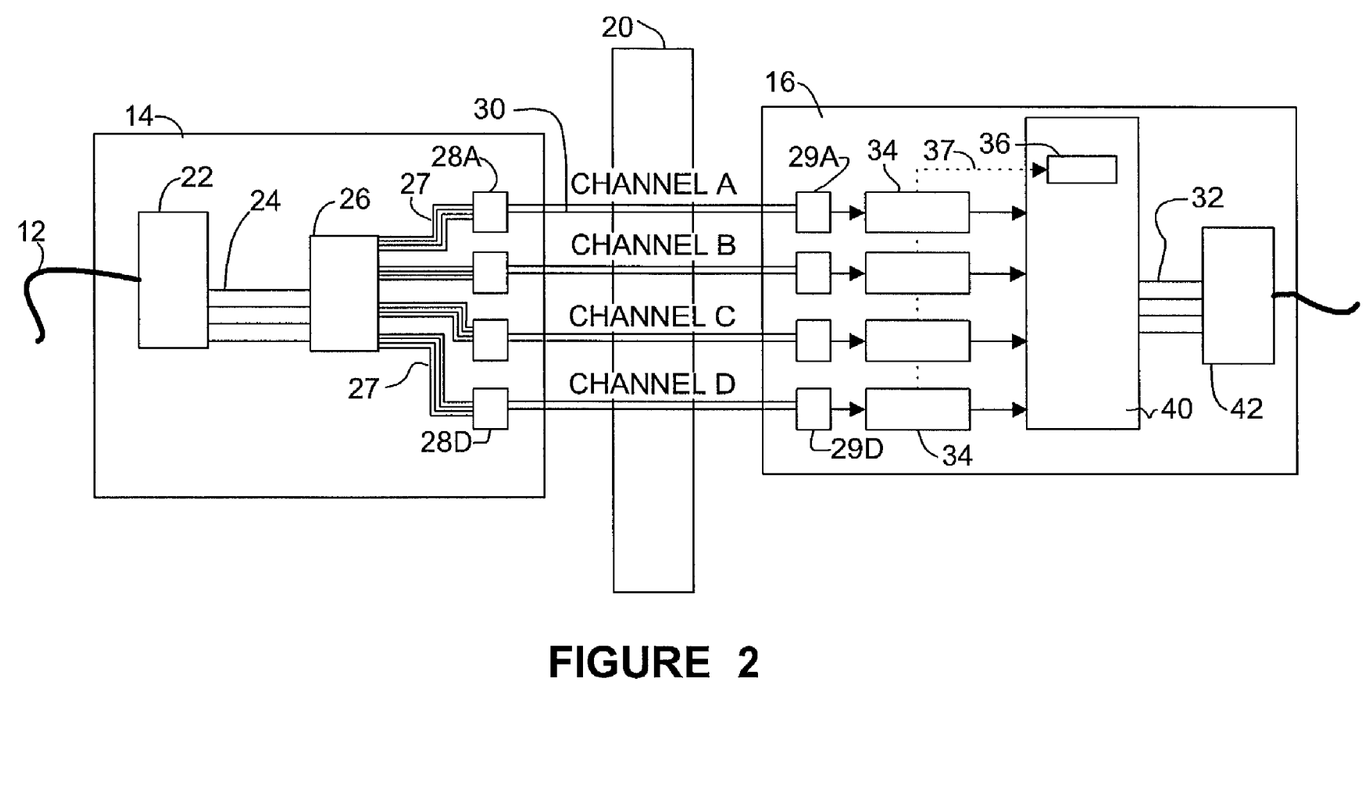
FIG. 2 is a more detailed block diagram of a portion of the switch of FIG. 1.

As shown in FIG. 2, data received from an incoming signal at optical fiber input 12 is received at an ingress chip 22 on line card 14. The received data is placed on a wide bus 24 operating at a relatively slow speed. Bus 24 may comprise, for example, a 128-bit wide data portion operating at 100 MHz (for an aggregate throughput of 12.8 Gb/s). Bus 24 may comprise additional bits for control signals or additional header information. The use of a wide bus 24 permits bus 24 to operate at a rate that is compatible with both ingress chip 22 and a FPGA 26.

FPGA 26 may provide various functions including header translation. Because ingress chip 24 and FPGA 26 operate at relatively slow speeds they can be made with less expensive technology than would be required if bus 24 operated at a higher speed. This is particularly advantageous with respect to FPGA 26 since, while FPGAs capable of operating at clock frequencies significantly in excess of 100 MHz are becoming available, such FPGAs can be very expensive.

Midplane 20 typically is pin-limited (i.e. it has too few available signal conductors to simply extend bus 24 between a line card 14 and a FIC 16). The term "midplane" is not limited to specific physical locations of signal conductors relative to any cards. The term midplane includes structures which are referred to as backplanes. Providing midplane 20 with enough signal conductors to permit signal paths in excess of 128 bits wide to be established between line cards 14 and FICs 16 is undesirably complicated and expensive.

Figure 4:
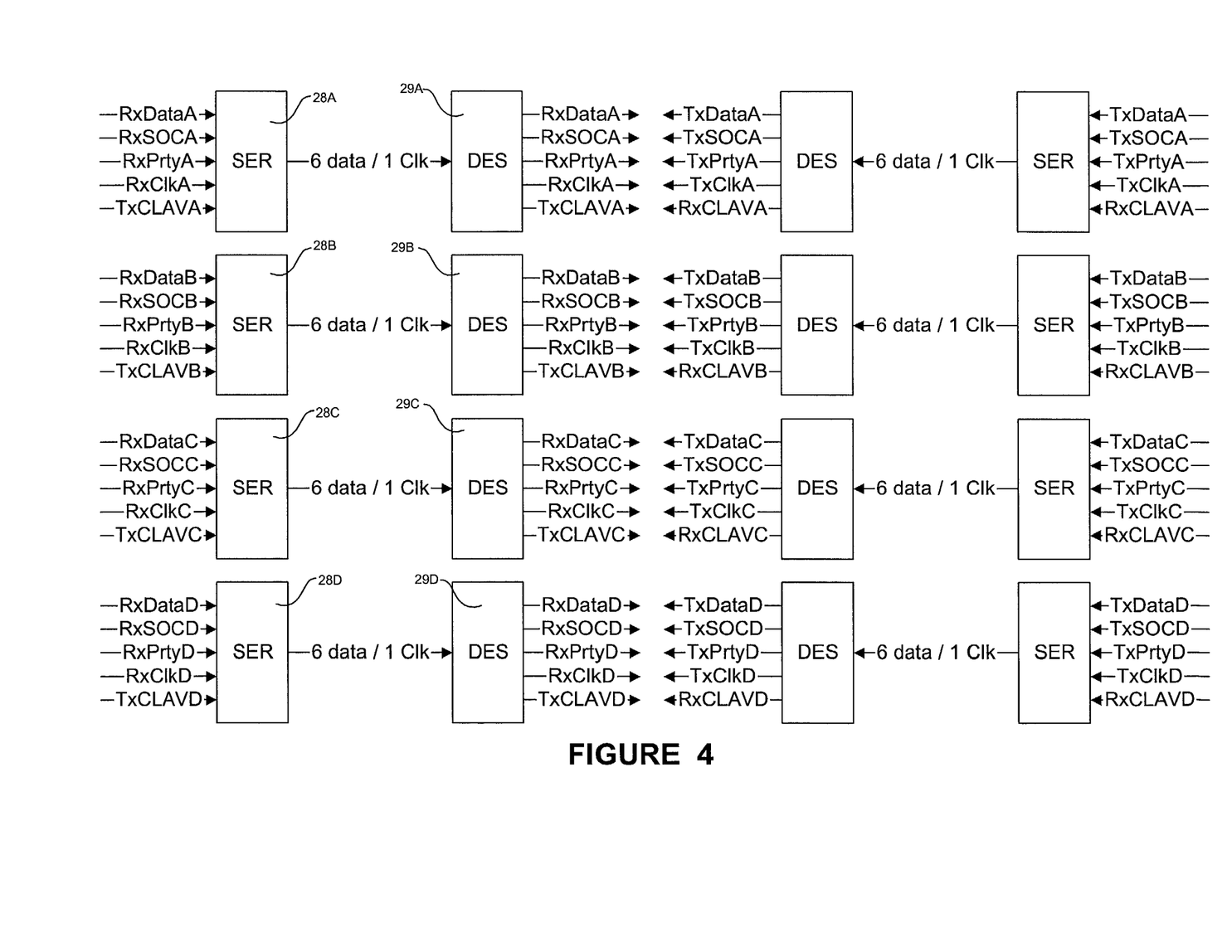
FIG. 4 shows signals in a bidirectional interface according to one embodiment of the invention; and, FIG. 5 is a block diagram illustrating a bidirectional interface between a pair of cards according to the invention.

The system of the invention breaks the data in bus 24 into a number of channels in each direction for transmission to and from FICs 16. In the illustrated embodiment there are four channels labeled "A", "B", "C" and "D". For simplicity, FIG. 2 only shows channels in the direction from line card 14 to FIC 16. FIG. 4 shows a possible configuration for one bidirectional channel across a midplane 20. Data going in the direction from line card 14 to FIC 16 is designated "Rx" because it is received on the input 12 of a line card 14. This direction may be called a "first direction". Data going in the direction from FIC 16 to line card 14 is designated "Tx"

because it is destined to be transmitted to some other device by line card 14. This direction may be called a "second direction".

Data from bus 24 may be separated into channels by suitable logic on line card 14. The logic for dividing data from bus 24 into channels may be equivalently implemented in fixed hardware or software (if sufficient speed can be achieved). The logic may be termed a demultiplexing means. The logic may be provided in FPGA 26. Data in the channels is transmitted serially between line card 14 and FIC 16 and therefore requires a reduced number of data lines.

To accomplish this, line card 14 comprises a plurality of serializer devices 28 and FIC 16 comprises a corresponding plurality of deserializer devices 29. In the illustrated embodiment, FPGA 26 comprises logic for dividing the data on bus 24 into four channels. FPGA 26 sends the data of each channel to a transmitting device for the channel. In the illustrated embodiment, each transmitting comprises a serializer device 28 on a bus 27. The transmitting devices may be called "transmitting means". Each bus 27 may operate at the same frequency as bus 24.

The data for each channel is routed from a serializer device 28 to a corresponding deserializer device 29 by way of a bus 30. Bus 30 comprises a number of data lines which extend through midplane 20. Serializer devices 28 could comprise, for example, model DS90CR483 serializer components available from National Semiconductor. Deserializer devices could comprise, for example, model DS90CR484 deserializer components available from National Semiconductor. A serializer device 28 and a deserializer device for data going in the opposite direction can conveniently be combined into a serializer/deserializer (SerDes) device.

Each channel carries a portion of the data from bus 24 together with various control signals. For example, there may be four channels. Each channel carries some of the data from bus 24, a parity line, a start-of-cell signal, a control signal in the direction of data flow (CLAV—cell available), a control signal in the direction opposite to data flow (RXENB—receive enable or TXENB—transmit enable), and a clock signal.

A serializer device 28A on line card 14 receives parallel data from a corresponding bus 27 and outputs that parallel data as one or more streams of serial data on bus 30 which connects to a corresponding FIC 16. In a typical embodiment of the invention, each serializer device 28 receives a data stream 48 bits wide from bus 27 and outputs 8 streams of serial data. A clock signal at the frequency of bus 24 occupies a $9^{th}$ data stream. Bus 30 operates at a higher rate than bus 27 so that throughput is maintained. In an example embodiment of the invention bus 30 operates at 700 MHz. Bus 30 connects to a corresponding deserializer device 29A at its destination on FIC 16.

Each data stream typically requires 2 data lines through midplane 20. It can be seen that with this construction, all of the 12.8 Gb/s data from bus 24 can be transmitted across midplane 20 using only 36 pairs of data lines. This is a substantial reduction compared to the number of data lines in bus 24. Data in the channels is recombined into a single data stream when it reaches its destination (in this case FIC 16). At deserializer devices 29, the data sent by serializer devices 28 is received and converted back into parallel data. This may be done by any suitable multiplexing means. The data is then placed onto a parallel data bus 32 which carries the data to a switch interface device 42.

In the preferred embodiment, the data being transmitted comprises fixed-size data packets or "cells". Each cell is delivered in one channel. The cells are assigned to channels in rotation. For example, where there are four channels A through D, the first cell is assigned to channel A, the second cell to channel B, the third cell to channel C, the fourth cell to channel D, the fifth cell to channel A, and so on. The cells can be assigned to channels in rotating order by a suitable demultiplexing means. Each of the N channels receives every $N^{th}$ packet.

This arrangement can optionally be made to operate in dual modes. In a first mode, which is described above, a single data stream is separated into channels for transmission across midplane 20. In another mode, ingress device 22 receives a number of separate lower-rate data streams and sends each separate stream across midplane 20 in a separate channel. For example, such a device could transmit a single stream of OC-192 data in its first mode and four streams of OC-48c data in its second mode. A dual mode device would have multiple inputs to ingress device 22 (or multiple ingress devices 22).

Figure 3:
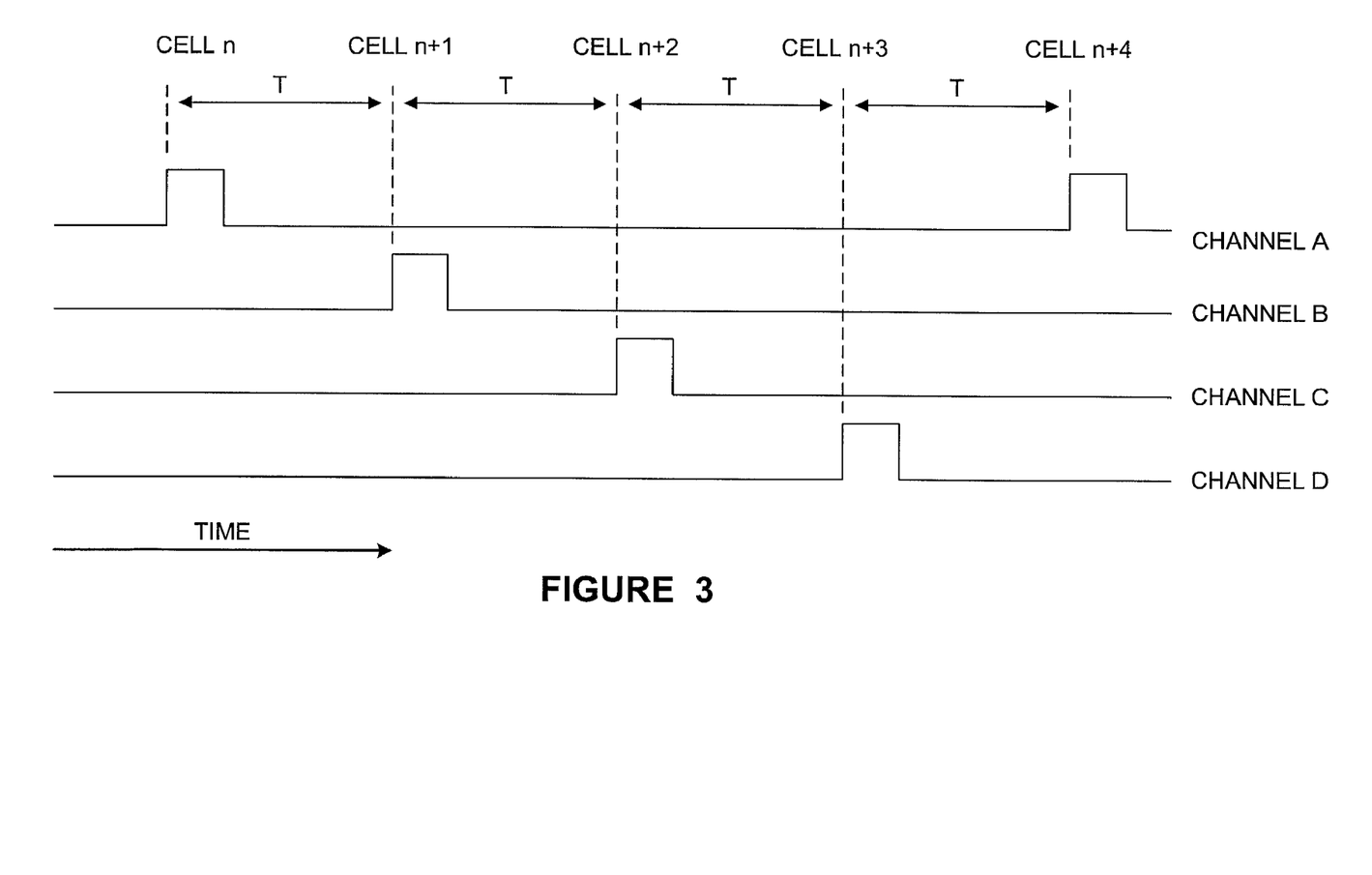
FIG. 3 is a timing diagram showing a relationship between cell streams in multiple channels.

As noted above, it is necessary to provide a mechanism which can cause the cells to be received in order at destination FIC 16. The method of the invention maintains cell ordering by staggering the cell streams in each of the channels relative to one another. As shown in FIG. 3, there is an interval $\Delta T$ between the time that transmission of a packet commences on one channel and the time that the transmission of the next packet commences on the next channel. Cells are only transmitted on $\Delta T$ boundaries. $\Delta T$ is chosen to be sufficiently large that packets are guaranteed to arrive at the destination deserializer devices 29 in order, and that this order can be correctly determined, despite any worst-case inter-channel variations in latency and skew. A control circuit, which may be called a control means, controls each of the transmitting devices so that the transmission of each cell begins on a $\Delta T$ boundary. The control circuit may, for example, comprise a clock at intervals of $N\Delta T$ as shown in FIG. 3.

Where the arrival of a cell is detected by sampling for a signal, such as a start-of-cell signal, at a specified clock rate, the start-of-cell signal will be detected within one cycle of the sampling clock. Where the sampling clock operates at 100 MHz, the start-of-cell signal will be detected sometime within 10 ns after it is asserted. Where OC-192 data is being transmitted across a midplane in four channels and a 100 MHz clock is used to sample for the arrival of cells it is convenient to choose $\Delta T$ to be approximately 40 ns. This allows 10 ns for the detection of the start of a cell plus 30 ns to accommodate any inter-channel variations in latency and skew.

In normal operation, a cell is sent on one channel every 40 ns. However, if there is no cell to send, or if one channel is not enabled, the transmitter should wait 40 ns before starting to send another cell. Cells should only be sent on $\Delta T$ boundaries. When a channel is not enabled, the transmitter should automatically try the channel again after a time $\Delta T$ has elapsed. In the alternative, the transmitter could proceed to the next channel after a time $\Delta T$.

The reception of cells at FIC 16 is coordinated by a receiver control circuit 40. As data is received by deserializer devices 29 it is placed in first in/first out (FIFO) buffers 34. Receiver control circuit 40 places cells from buffers 34 onto bus 30 in the order that the cells are received. To do this, receiver control circuit 40 may determine the order in which start-of-cell signals, which indicate the arrival of a cell are received in the individual channels. In the illustrated embodiment, receiver control circuit 40 comprises a small FIFO buffer 36. When a deserializer device 29 receives a cell it sends a signal 37 which is stored in FIFO buffer 36. The data in FIFO buffer 36 therefore indicates the order of arrival of cells at FIC 16. Receiver control circuit 40 can sample FIFO 36 every ΔT (e.g. every 40 ns) to determine which of FIFOs 34 to service. Since cells may be dropped, receiver control circuit 40 only stores in FIFO 36 information regarding cells which have arrived and have been stored in a FIFO 34. This may be implemented, for example, by permitting each channel to generate and send to FIFO 36 an end-of-cell signal 37 to receiver 40 which keeps track of the order of the cells and services FIFOs 34 in order.

Figure 5:
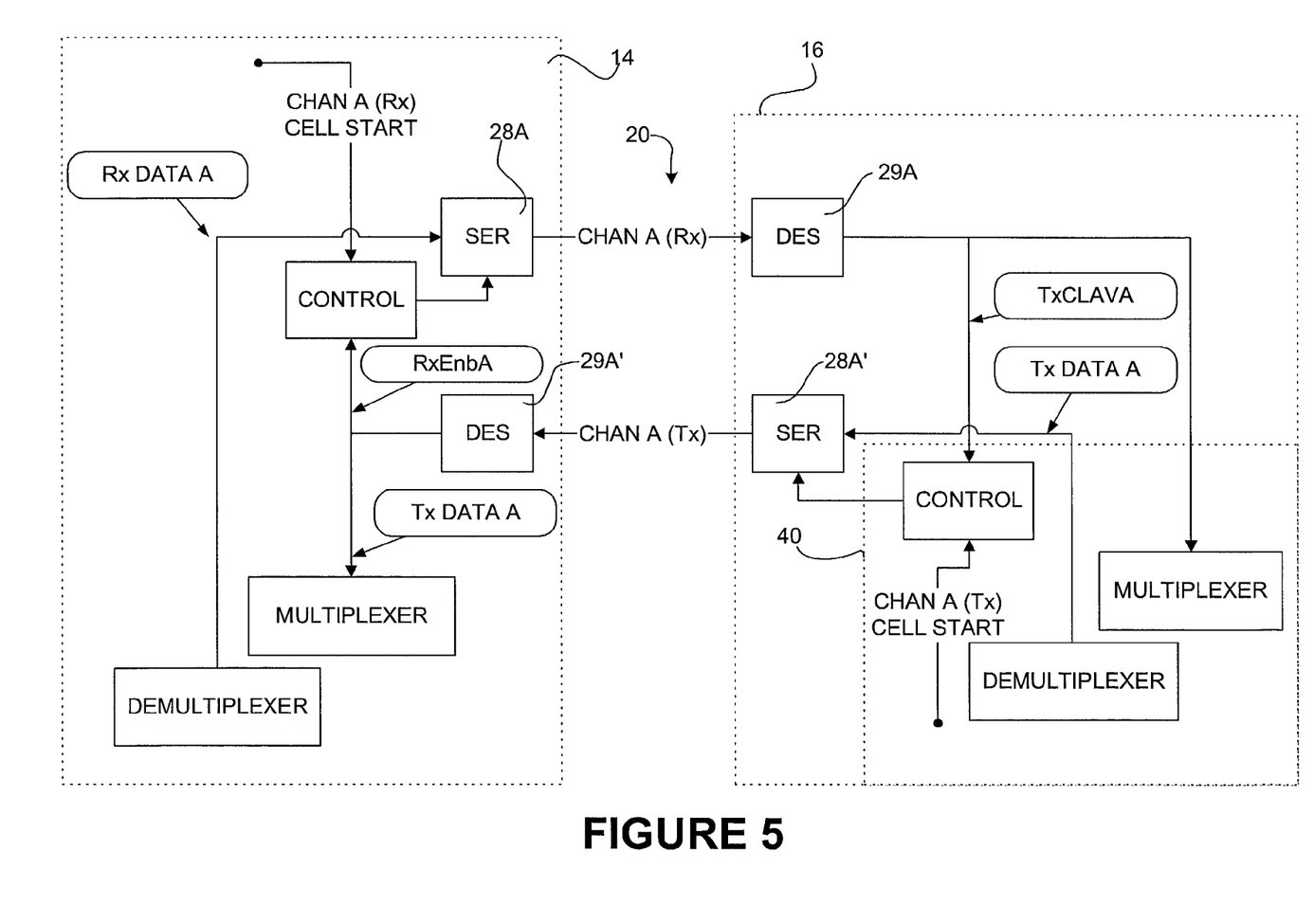

In general, it is desirable to provide flow control signals for each channel. A receive-enable signal (RxEnb) is generated at receiver control circuit 40. A serializer device 28 on line card 14 is inhibited from transmitting on a channel unless RxEnb is set for the channel. Since the RxEnb signals are traveling in a direction opposite to the flow of data in bus 30, RxEnb signals are preferably multiplexed into data in channels going in the opposite direction (in this case, from FIC 16 to line card 14). FIG. 4 shows an example of signals in a bidirectional interface according to the invention. As shown in FIGS. 4 and 5, a TxEnb signal, which is multiplexed with the channel data, is used to control the transmission of data from FIC 16 to line card 14.

Because of the latency associated with the transmission of data back and forth between line cards 14 and FICs 16, a pipelining concept is used for the timing of the RxEnb signals controlling the delivery of cells in each channel. If there were no latency then, upon a FIFO 34 receiving the last cell it can hold, receiver 40 could deassert the RxEnb signal and thereby prevent additional cells from being transmitted. Serializer device 28 would react to the deassertion of the RxEnb signal in time to defer sending a next cell on that channel. The latencies involved in the round-trip signal path between line cards 14 and FICs 16 make this impractical.

Accordingly, each FIFO 34 is made large enough to hold at least P cells (where P is an integer). When FIFO 34 is holding P-Q cells (where Q is an integer in the range of $1 \leq Q \leq (P-1)$) then receiver 40 deasserts RxEnb for that channel. Q is selected so that even in the worst case latency through the system, the transmitter (e.g. serializer device 28) will stop sending cells in time to prevent FIFO 34 from overflowing.

FIG. 5 shows one channel of a bidirectional interface according to the invention. A first card (e.g. line card 14) includes a first transmit interface and a first receive interface. The first transmit interface comprises a first demultiplexer, and a first data transmission device. In the illustrated embodiment the first data transmission device comprises a serializer device 28A. Transmission of cells by serializer device 28A is controlled by a first transmit control circuit.

The first receive interface comprises a deserializer device 29A' a multiplexer, and a first receive control circuit. In the illustrated embodiment, the first transmit control circuit and the first receive control circuit are combined in a control circuit labeled "CONTROL".

In FIG. 5, a second card (e.g. FIC 16) has a second transmit interface and a second receive interface. The second receive interface may be connected to receive data from the first transmit interface. The second transmit interface may be connected to transmit data to the first receive interface.

Where a component (e.g. an assembly, device, memory, etc.) is referred to above, unless otherwise indicated, reference to that component (including a reference to a "means") should be interpreted as a reference to any component which performs the function of the described component (i.e. is functionally equivalent to the described component), including components which are not structurally equivalent to the disclosed structure which performs the function in the illustrated exemplary embodiments of the invention. Where a step in a method is referred to above, unless otherwise indicated, reference to that step should be interpreted as a reference to any step which achieves the same result as the step (i.e. is functionally equivalent to the described step), including steps which achieve a stated result in different ways from those disclosed in the illustrated exemplary embodiments of the invention.

As will be apparent to those skilled in the art in the light of the foregoing disclosure, many alterations and modifications are possible in the practice of this invention without departing from the spirit or scope thereof. For example:

The number of channels does not need to be four. More or fewer than four channels may be provided in each direction;

The serializer devices and deserializer devices may be combined with other devices;

The data in each channel does not need to be carried serially across midplane 20. The data could be transmitted across midplane 20 as parallel data transmitted at a high enough rate that a reduced number of signal conductors are required in the midplane. The terms "transmitting devices" and "transmitting means" include serializer devices and devices for transmitting the data in each channel as parallel data;

The demultiplexing means may be incorporated in ingress device 22 or in an additional device.

Accordingly, the scope of the invention is to be construed in accordance with the substance defined by the following claims.

What is claimed is:

1. Data transmission apparatus comprising a first transmit interface for transmitting a data stream comprising a sequence of fixed-size transmit packets to a receiver, the first transmit interface comprising:

a first demultiplexer connected to receive the data stream and to split the data stream by delivering the transmit packets in rotation into a plurality of N transmit channels, so that each said transmit channel carries every $N^{th}$ transmit packet;

a plurality of data transmitting devices, each data transmitting device connected to receive the transmit packets of a corresponding one of the N transmit channels and to output the transmit packets of the corresponding one of the N transmit channels on a corresponding data connection for transmitting data over a mid-plane to the receiver, wherein each data transmitting device comprises a serializer device and the corresponding data connection comprises a serial data connection; and, a first transmit control circuit connected to the data transmitting devices, the first transmit control circuit configured to cause the data transmitting devices to output the transmit packets in sequence with commencement of transmission of the transmit packets from sequential data transmitting devices staggered in time relative to one another by a time difference ΔT;

wherein:

the first transmit interface is located on a line card having an interface for receiving the data stream, the receiver is located on a second card, and the serial data connections comprise data lines extending between the line card and the second card through the midplane;

the receiver comprises a second receive interface, the second receive interface comprising:
   a plurality of deserializer devices, each of the deserializer devices connected to a corresponding one of the data connections for receiving the transmit packets of the corresponding one of the N transmit channels after transmission of the transmit packets of the corresponding one of the N transmit channels from the line card to the second card over the mid-plane;
   a plurality of buffers, each of the buffers connected to accept the transmit packets from a corresponding one of the deserializer devices and each of the buffers having a capacity sufficient to hold a plurality of the transmit packets; and,
   a second receive control circuit configured to determine a sequence of arrival of the transmit packets in the serial data in the plurality of buffers and to place the transmit packets onto a bus in the sequence of arrival;
wherein:
   the second receive control circuit is configured to issue a flow control signal when any one of the buffers has a remaining capacity of Q packets or fewer, with $Q \geq 1$;
   the second card comprises a transmitter connected to transmit the flow control signal to the line card; and
   the first transmit control circuit is configured, in response to the flow control signal, to inhibit transmission of the transmit packets on at least one of the N transmit channels corresponding to the one of the buffers which has the remaining capacity of Q packets or fewer; and
   the transmitter on the second card comprises a second transmit interface for transmitting a second data stream comprising a second sequence of fixed-size second packets to the line card, the second transmit interface comprising:
      a second demultiplexer connected to receive the second data stream and to split the second data stream by delivering the second packets in rotation into a second plurality of N second channels so that each said second channel carries every Nth second packet;
      a plurality of second serializer devices, each second serializer device connected to receive the second packets of a corresponding one of the N second channels and to output the second packets as serial data on one or more second serial data connections over the mid-plane to the line card; and,
      a second transmit control circuit connected to the second serializer devices, the second transmit control circuit configured to cause the second serializer devices to output the second packets of the second data stream in sequence and staggered in time relative to one another by a time difference $\Delta T$.

2. The apparatus of claim 1 wherein the second transmit control circuit is configured to multiplex the flow control signal into the second data stream.

3. Data transmission apparatus of claim 1 wherein a rate of data on each of the plurality of N transmit channels is N times lower than a data rate of the data stream.

4. A telecommunications switch comprising a plurality of line cards, a switching fabric, a plurality of fabric interface cards connected to the switching fabric and a midplane providing a plurality of data lines connecting the line cards and the fabric interface cards, the telecommunications switch comprising at least one bidirectional interface connecting a line card and a fabric interface card;
   the bidirectional interface carrying a first sequence of data packets in a first data stream received at the line card in a first direction from the line card to the fabric interface card and a second sequence of data packets in a second data stream in a second direction from the fabric interface card to the line card;
   the bidirectional interface comprising:
   a first demultiplexer connected to receive the first data stream and to split the first data stream into a first plurality of N first direction channels so that each first direction channel carries every Nth first direction packet;
   for each first direction channel, a first direction serializer device connected to receive the first direction packets of the first direction channel and to output the first direction packets as first direction serial data on one or more first direction serial data connections extending from the line card, through the midplane, to the fabric interface card;
   a first transmit control circuit connected to the first direction serializer devices, the first transmit control circuit configured to cause the first direction serializer devices to output the first direction packets in sequence order with commencement of transmission of first direction packets on different first direction channels staggered in time relative to one another by a time difference $\Delta T$;
   a plurality of first deserializer devices at the fabric interface card, the first deserializer devices connected to receive and deserialize the first direction serial data on the first direction serial data connections;
   a first direction receive control circuit connected to detect an order of arrival of first direction packets on the first direction serial data connections and to place the first direction packets into a first direction received data stream in the order of arrival of the first direction packets;
   a second demultiplexer at the fabric interface card and connected to receive the second data stream and to split the second data stream into a second plurality of N second direction channels so that each second direction channel carries every Nth second direction packet;
   for each second direction channel, a second direction serializer device connected to receive the second direction packets of the second direction channel and to output the second direction packets as second direction serial data on one or more second direction serial data connections extending from the fabric interface card, through the midplane, to the line card;
   a second transmit control circuit connected to the second direction serializer devices, the second transmit control circuit configured to cause the second direction serializer devices to output the second direction packets in sequence order with commencement of transmission of second direction packets on different second direction channels staggered in time relative to one another by a time difference $\Delta T$;
   a plurality of second deserializer devices at the line card, the second deserializer devices connected to receive and deserialize the second direction serial data on the second direction serial data connections; and,
   a second direction receive control circuit connected to detect an order of arrival of second direction packets on the second direction serial data connections and to place the second direction packets into a second direction received data stream in the order of arrival of the second direction packets.

5. The switch of claim 4 wherein the fabric interface card comprises:
a plurality of first direction receive buffers, each first direction receive buffer associated with a corresponding one of the first deserializer devices and configured to receive the first direction packets from its associated first deserializer device.

6. The switch of claim 5 wherein the first direction receive control circuit is configured to provide first direction receiver enable signals to the first transmit control circuit in response to a status of at least one of the plurality of first direction receive buffers.

7. The switch of claim 5 wherein the first direction receive control circuit is configured to issue a first direction flow control signal when any one of the plurality of first direction receive buffers has a remaining capacity of Q packets or fewer, with $Q \geq 1$, wherein the fabric interface card comprises a transmitter connected to transmit the first direction flow control signal to the line card and wherein the first transmit control circuit is configured, in response to the first direction flow control signal, to inhibit transmission of the first direction packets on at least one of the N first direction channels corresponding to the one of the plurality of first direction receive buffers which has the remaining capacity of Q packets or fewer.

8. The switch of claim 7, wherein
upon inhibiting transmission of packets in the at least one of the N first direction channels, the first transmit control circuit is configured to:
wait without transmission at first direction packets in the at least one of the N first direction channels; and
recommence transmission of pockets in the at least one of the N first direction channels an integer multiple of the time difference $\Delta T$ after a time at which transmission of a previous packet commenced on the at least one of the N first direction channels.

9. The switch of claim 5 comprising means for generating a first direction receiver enable signal which causes the first transmit control circuit to disable at least one of the first direction serializer devices upon arrival, in one of the plurality of first direction receive buffers, of a second last packet that the one of the plurality of first direction receive buffers can hold.

10. The switch of claim 4 wherein the first transmit control circuit is adapted to receive a first direction flow control signal originating from the fabric interface card and the first transmit control circuit is adapted to selectively enable or inhibit the transmission of the first direction packets by one of the first serializer devices in response to the first direction flow control signal.

11. The switch of claim 10 wherein the second direction receive control circuit is adapted to generate a second direction flow control signal and the first transmit control circuit is adapted to cause one of the first serializer devices to output the second direction flow control signal.

12. The switch of claim 11 wherein the second transmit control circuit is adapted to receive the second direction flow control signal and the second transmit control circuit is adapted to selectively enable or inhibit the transmission of the second direction packets by one of the second serializer devices in response to the second direction flow control signal.

13. The switch of claim 4 wherein the first data stream comprises an OC-192 data stream.

14. The switch of claim 4 wherein the time difference $\Delta T$ is greater than a maximum total skew due to the mid-plane, the the first direction serializer devices and the first direction serializer devices.

* * * * *